(12) United States Patent
Castillo et al.

(10) Patent No.: US 10,616,671 B2
(45) Date of Patent: Apr. 7, 2020

(54) SURROUND STRUCTURE OF SPEAKER (71) Applicant: TYMPHANY ACOUSTIC TECHNOLOGY (HUIZHOU) CO., LTD., Huizhou, Guangdong Province (CN)

(72) Inventors: Jorge Alejandro López Castillo, Huizhou (CN); Zhongpin Tang, Huizhou (CN); Shaoting Huang, Huizhou (CN)

(73) Assignee: TYMPHANY ACOUSTIC TECNHOLOGY (HUIZHOU) CO., LTD., Huizhou, Guangdong Province (TW)

( * ) Notice: Subject to any disclaimer, the term of this patent is extended or adjusted under 35 U.S.C. 154(b) by 0 days.

(21) Appl. No.: 16/189,860

(22) Filed: Nov. 13, 2018

(65) Prior Publication Data
US 2019/0149901 A1    May 16, 2019

(30) Foreign Application Priority Data
Nov. 10, 2017   (CN) .......................... 2017 1 1106328

(51) Int. Cl.
*H04R 1/02* (2006.01)
*H04R 7/20* (2006.01)
*H04R 7/16* (2006.01)

(52) U.S. Cl.
CPC .............. *H04R 1/025* (2013.01); *H04R 7/16* (2013.01); *H04R 7/20* (2013.01)

(58) Field of Classification Search
CPC ............... H04R 7/16; H04R 7/18; H04R 7/20
See application file for complete search history.

(56) References Cited

U.S. PATENT DOCUMENTS

| 7,054,459 | B2 * | 5/2006 | Kuze | H04R 7/20 |
|---|---|---|---|---|
| | | | | 181/172 |
| 7,438,155 | B2 * | 10/2008 | Stead | G10K 13/00 |
| | | | | 181/171 |
| 8,139,812 | B2 * | 3/2012 | Basnet | H04R 7/20 |
| | | | | 181/171 |
| 8,340,340 | B2 * | 12/2012 | Bogdanov | H04R 7/20 |
| | | | | 381/396 |
| 2016/0080870 | A1 * | 3/2016 | Vieites | H04R 7/26 |
| | | | | 381/398 |

\* cited by examiner

*Primary Examiner* — Fan S Tsang
*Assistant Examiner* — Angelica M McKinney
(74) *Attorney, Agent, or Firm* — Muncy, Geissler, Olds & Lowe, P.C.

(57) ABSTRACT

A surround structure includes an inner rim, an outer rim, and a wave-shaped elastic protrusion, disposed between the inner rim and the outer rim. The wave-shaped elastic protrusion is integrally formed by a plurality of arc-shaped parts. Each arc-shaped part includes a first end, a second end, and a middle part between the first end and the second end. A radial section of each arc-shaped part is arcuate and includes a top edge and two arc-shaped segments combined with two sides of the top edge. A curvature of a radial section of each arc-shaped segment from the first end to the middle part gradually decreases, a curvature of a radial section of each arc-shaped segment from the middle part to the second end gradually increases, and a shape of a radial section of the first end is the same as a shape of a radial section of the second end.

10 Claims, 8 Drawing Sheets

FIG. 11

SURROUND STRUCTURE OF SPEAKER

CROSS REFERENCE TO RELATED APPLICATIONS

This application claims priority to CN 201711106328.1, which was filed on Nov. 10, 2017, and which is herein incorporated by reference.

BACKGROUND

Technical Field

This application relates to a surround structure, and in particular, to a surround structure of a speaker.

Related Art

A surround is one of the important components in a speaker. A surround is generally made of an elastic material, and has elasticity and toughness characteristics. In addition to providing preferred output power and audio characteristics for the speaker, the surround is a basis for quality control when the speaker is manufactured by a speaker manufacturer and can effectively prolong the service life of the speaker.

A cross-section of an existing surround body along an extending direction of the surround is generally of a uniform shape. During vibration of a speaker having such a surround, vibration may be irregular at different positions of a diaphragm and at different frequencies, instead of being theoretically symmetrical and uniform. Consequently, balance and symmetry of an operation curve of a speaker unit are affected, leading to relatively severe distortion.

SUMMARY

In view of above problems, the present disclosure provides a surround structure of a speaker, including: an inner rim; an outer rim; and a wave-shaped elastic protrusion combined between the inner rim and the outer rim, wherein the wave-shaped elastic protrusion is integrally formed by a plurality of arc-shaped parts. Each arc-shaped part includes: a first end, a second end, and a middle part between the first end and the second end. A radial section of each arc-shaped part is arcuate and includes a top edge and two arc-shaped segments combined with two sides of the top edge, wherein a curvature of a radial section of each arc-shaped segment from the first end to the middle part gradually decreases, a curvature of a radial section of each arc-shaped segment from the middle part to the second end gradually increases, and a shape of a radial section of the first end is the same as a shape of a radial section of the second end.

In an embodiment, the top edges of the arc-shaped parts are located at same heights and are concyclic.

In an embodiment, each arc-shaped part includes an inner arc edge and an outer arc edge, the inner arc edges of the arc-shaped parts are located at same heights and are concyclic, and the outer arc edges of the arc-shaped parts are located at same heights and are concyclic.

In an embodiment, each arc-shaped part is symmetrically disposed by using the middle part as a center.

In an embodiment, the radial section of the first end and the radial section of the second end are semicircular.

In an embodiment, the wave-shaped elastic protrusion is symmetrically disposed with respect to a reference plane, and the reference plane is coplanar with the first end or the second end of an arc-shaped part.

In an embodiment, the wave-shaped elastic protrusion includes an odd quantity of arc-shaped parts, and the reference plane is further coplanar with the middle part of another arc-shaped part.

In an embodiment, each arc-shaped segment includes one first point on the first end and one second point on the second end, where the first point and the second point are located at same heights, and a connection line from the first point to the second point along a surface of the arc-shaped segment is a smooth curve.

In an embodiment, the radial section of the first end of each arc-shaped part includes a first vertex and two first bottom end points. A reference line is defined between the two first bottom end points, wherein a reference circle is defined according to the first vertex and a midpoint of the reference line, connection lines between the first vertex and the first bottom end points run through the reference circle to form intersection points, and curvature of each arc-shaped segment in the middle part is defined according to an arc formed between the intersection point and the first vertex.

In an embodiment, each arc-shaped part includes a plurality of first sampling points at positions of different heights on the first end and a plurality of second sampling points respectively corresponding to the plurality of first sampling points on the second end, the curvature of the radial section of each arc-shaped segment from the first end to the middle part and the curvature of the radial section from the middle part to the second end are defined according to respective connection lines between the plurality of first sampling points and the plurality of second sampling points.

Based on the above, in the surround structure of a speaker in this application, the curvature of the radial section of each arc-shaped segment from the first end to the middle part gradually decreases, and the curvature of the radial section of each arc-shaped segment from the middle part to the second end gradually increases, so that the surface of each arc-shaped part of the wave-shaped elastic protrusion has a curvature variation instead of having a uniform shape. In this way, the overall rigidity of the surround structure can be changed, and the surround structure has a more linear operation curve and better symmetry and balance between a negative movement and a positive movement, thereby effectively decreasing sound distortion.

DETAILED DESCRIPTION

Figure 1:
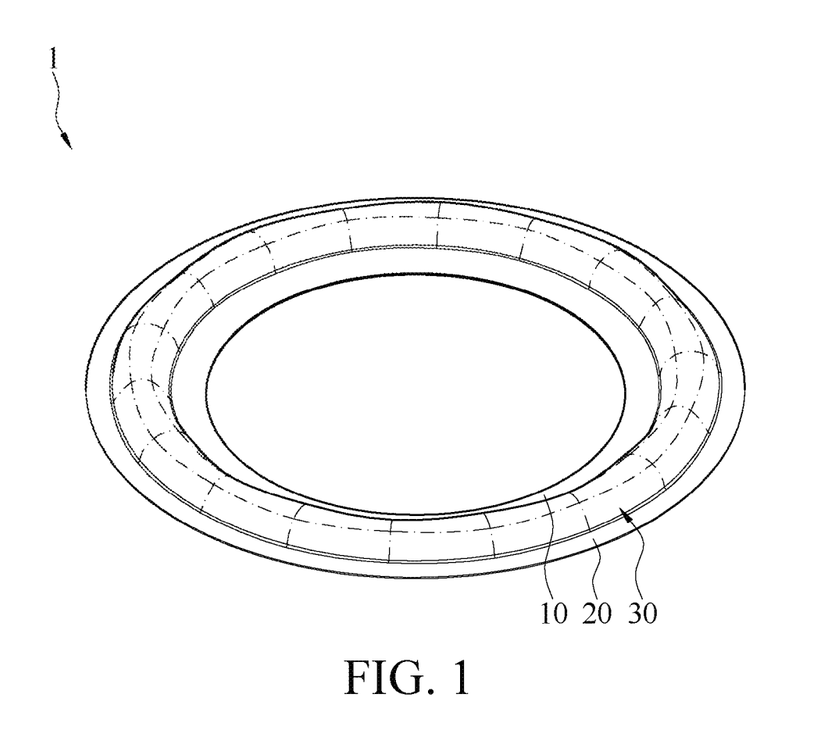
FIG. 1 is a schematic three-dimensional view of an embodiment of a surround structure according to this application.
Figure 2:
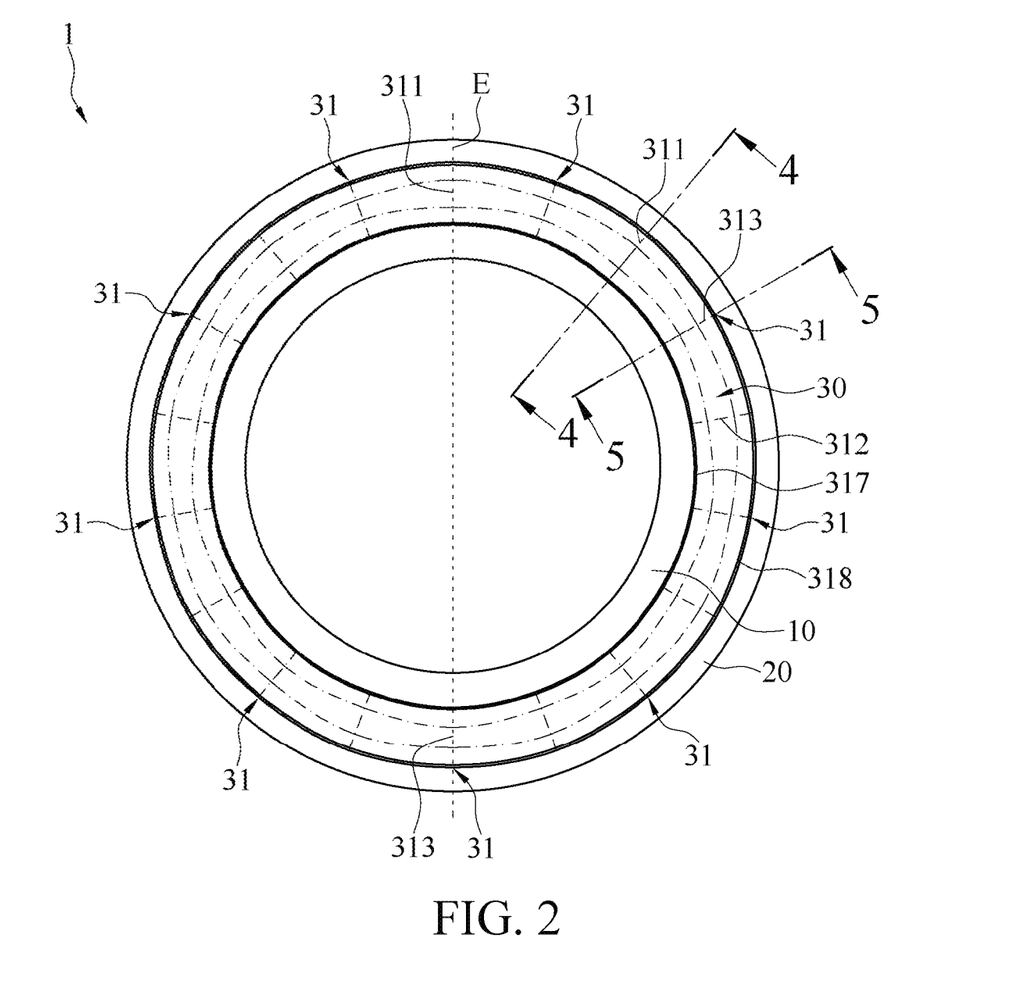
FIG. 2 is a top view of an embodiment of a surround structure according to this application.

FIG. 1 and FIG. 2 illustrate an embodiment of a surround structure 1 of a speaker according to the present invention. In this embodiment, the surround structure 1 is in a closed ring shape and includes an inner rim 10, an outer rim 20, and a wave-shaped elastic protrusion 30. The wave-shaped elastic protrusion 30 is positioned between the inner rim 10 and the outer rim 20. The surround structure 1 may be entirely made of an elastic material and has elasticity and toughness characteristics. For example, the surround structure 1 may be made of a rubber material, elastic fabric, or foam. In addition, the surround structure 1 may be formed to surround a speaker cone (not shown) of the speaker, for example, may be fixed to surround the speaker cone by using the inner rim 10 and the outer rim 20, so as to provide preferred output audio characteristics for the speaker.

Figure 3:
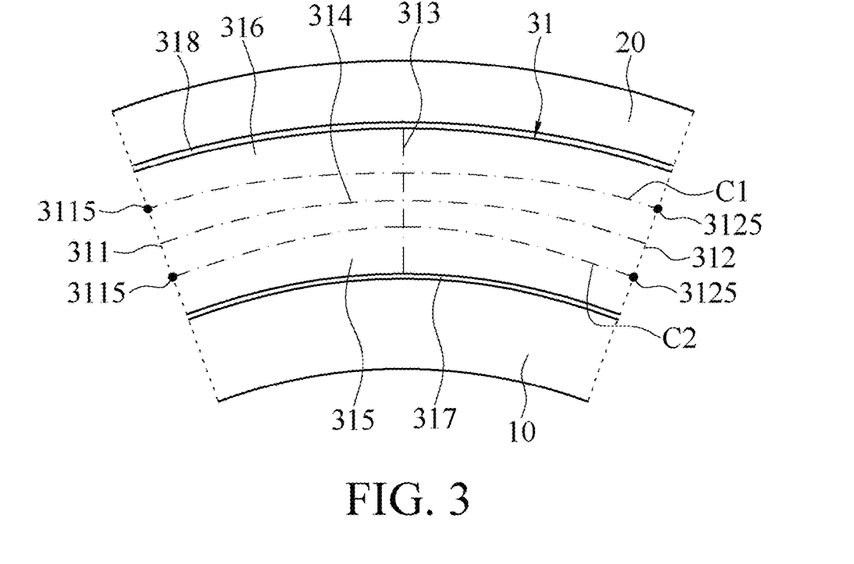
FIG. 3 is a partial top view of an embodiment of a surround structure according to this application.

Referring to FIG. 2 and FIG. 3, a wave-shaped elastic protrusion 30 is created by a plurality of arc-shaped parts 31 integrated together. FIG. 3 is an enlarged view of one of the arc-shaped parts 31. In this embodiment, the nine arc-shaped parts 31 are integrated together to form a wave-shaped elastic protrusion 30. The wave-shaped elastic protrusion 30 may determine a quantity of arc-shaped parts 31 according to requirements (for example, broadness of a range, a volume, or output power) of a speaker. For example, a larger speaker cone of the speaker indicates that a surround structure 1 having a larger diameter is needed, so that there is a larger quantity of arc-shaped parts 31 (for example, the wave-shaped elastic protrusion 30 is instead formed by 11, 13, or 15 arc-shaped parts 31 in a surrounding manner). In some embodiments, the wave-shaped elastic protrusion 30 may be formed by an even quantity (such as 8, 10, or 12) of arc-shaped parts 31. The quantity is not limited in this embodiment.

Figure 4:
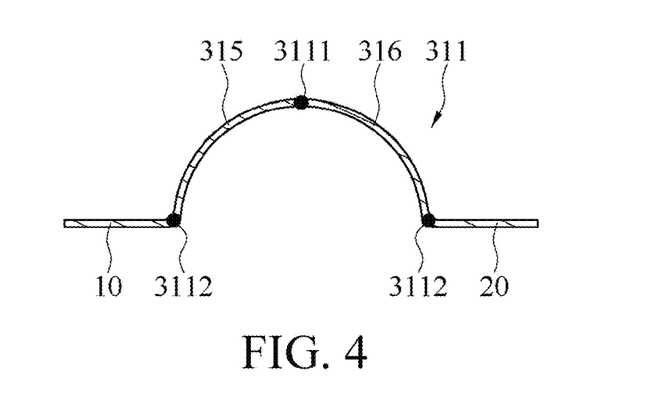
FIG. 4 is a schematic diagram of a radial section along a section line 4-4 in FIG. 2.
Figure 5:
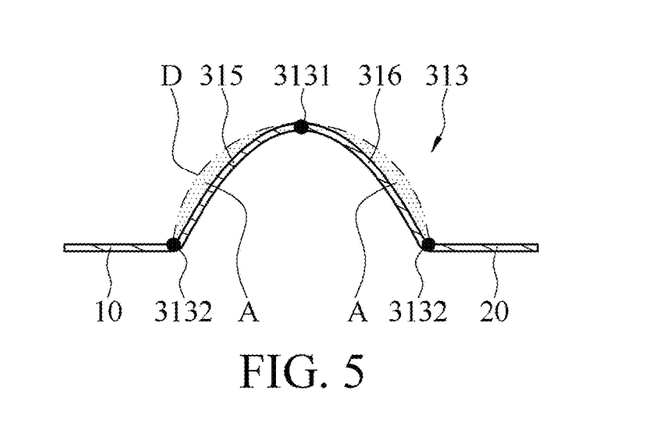
FIG. 5 is a schematic diagram of a radial section along a section line 5-5 in FIG. 2.

In the embodiment of FIG. 3, each arc-shaped part 31 includes: a first end 311, a second end 312, and a middle part 313 between the first end 311 and the second end 312 (positions of the first end 311, the second end 312, and the middle part 313 are represented by using dot-chain lines instead of lines actually existing in the arc-shaped part 31), and a radial section of each arc-shaped part 31 is arcuate (as shown in FIG. 4 and FIG. 5) and has a top edge 314 and two arc-shaped segments 315 and 316 combined with two sides of the top edge 314. In other words, using FIG. 4 and FIG. 5 as an example, the radial section of each arc-shaped part 31 bulges upward and is arcuate. In addition, curvature of a radial section of each of the arc-shaped segments 315 and 316 from the first end 311 to the middle part 313 gradually decreases, and curvature of a radial section of each of the arc-shaped segments 315 and 316 from the middle part 313 to the second end 312 gradually increases.

FIG. 4 is a schematic diagram of a radial section along a section line 4-4 in FIG. 2, which is a radial section of the first end 311 of each arc-shaped part 31. FIG. 5 is a schematic diagram of a radial section along a section line 5-5 in FIG. 2, which is a radial section of the middle part 313 of each arc-shaped part 31. It can be learned from FIG. 4 and FIG. 5 that curvature of a radial section of each of the arc-shaped segments 315 and 316 on the first end 311 is greater than curvature of a radial section of each of the arc-shaped segments 315 and 316 in the middle part 313. In addition, a shape of the radial section of the first end 311 of the arc-shaped part 31 is the same as the second end 312. For example, in the embodiment of FIG. 4, the radial sections of the first end 311 and the second end 312 may be semicircular. The figure for the radial section of the second end 312 is omitted. Therefore, the curvature of the radial section of each of the arc-shaped segments 315 and 316 from the first end 311 to the middle part 313 gradually decreases, and the curvature of the radial section of each of the arc-shaped segments 315 and 316 from the middle part 313 to the second end 312 gradually increases. A surface of the arc-shaped part 31 may be narrower in the middle and wider at the two ends. That is, the surface of each arc-shaped part 31 has a curvature variation instead of having a uniform shape, so that overall rigidity of the surround structure 1 can be changed.

Further, referring to FIG. 5, the radial section of each of the arc-shaped segments 315 and 316 at the first end 311 is represented by a dashed line D. Because the curvature of each of the arc-shaped segments 315 and 316 in the middle part 313 is less than the curvature at the first end 311, a region A is formed between the radial section of each of the arc-shaped segments 315 and 316 in the middle part 313 and the dashed line D. The radial section of each of the arc-shaped segments 315 and 316 from the first end 311 to the middle part 313 and the radial section from the middle part 313 to the second end 312 are located in the region A.

Further, referring to FIG. 3, the curvature of the radial section of each of the arc-shaped segments 315 and 316 from the first end 311 to the middle part 313 gradually decreases. The curvature of the radial section of each of the each arc-shaped segments 315 and 316 from the middle part 313 and the second end 312 gradually increases. Consequently, a connection line from a first point 3115 on the first end 311 to a second point 3125 at a same height on the second end 312 along the surface of each of the arc-shaped segments 315 and 316 is a smooth curve. For example, in the embodiment of FIG. 3, two first points 3115 are respectively defined on the first ends 311 of the arc-shaped segments 315 and 316, and two second points 3125 are defined on the second ends 312 of the arc-shaped segments 315 and 316. The two first points 3115 are respectively connected to the two corresponding second points 3125, to form two smooth curves C1 and C2 respectively. In addition, middle segments of the smooth curves C1 and C2, compared with segments at two sides, are closer to the top edge 314 of each arc-shaped part 31, so as to present a shape that is narrower in the middle and wider at the two ends. Further, referring to FIG. 1 and FIG. 2, the smooth curves C1 of the arc-shaped parts 31 are connected to each other to form a wave-shaped curve, and the smooth curves C2 of the arc-shaped parts 31 are connected to each other to form a wave-shaped curve (shown as wave-shaped dot-chain lines in FIG. 1 and FIG. 2). The wave-shaped dot-chain lines are used to indicate curvature of the surface of each arc-shaped part 31 instead of being lines actually existing in the arc-shaped part 31.

Figure 6:
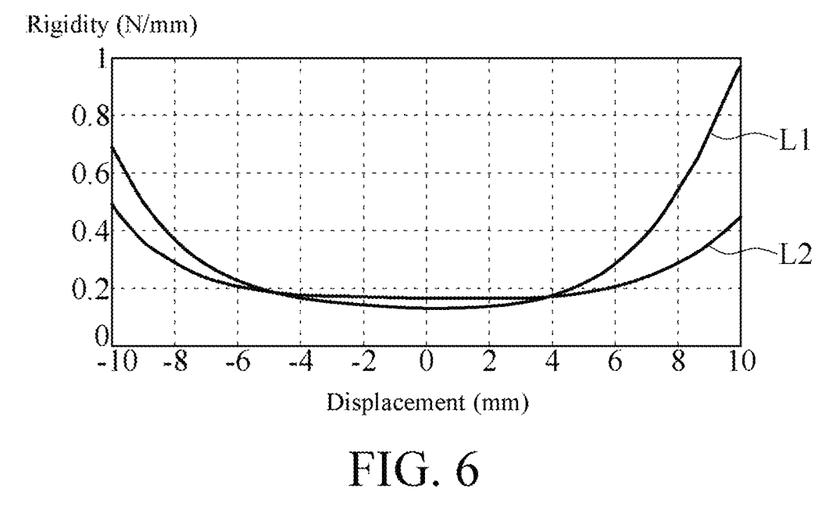
FIG. 6 is a diagram of a rigidity-displacement curve of an embodiment of a surround structure according to this application.

Referring to FIG. 6, FIG. 6 is a diagram of a rigidity-displacement curve generated by performing an experiment on the surround structure 1 in the foregoing embodiments. In this figure, a curve L1 represents a rigidity-displacement curve of a conventional surround having a cross-section of a uniform shape during operation. A curve L2 represents a rigidity-displacement curve of the surround structure 1 of this application during operation. The curve L2 of the surround structure 1 of this application is more linear than the curve L1, and has better symmetry and balance between negative and positive movements. Therefore, the surround structure 1 of this application can decrease sound distortion more effectively.

Further, referring back to FIG. 2, because the shape of the radial section of the first end 311 of the arc-shaped part 31 is same as the radial section of the second end 312, a first end 311 of one of two adjacent arc-shaped parts 31 can be smoothly connected to a second end 312 of the other of the adjacent arc-shaped parts 31, so that the entire surround structure 1 is smoother and can present a better operation curve.

Further, referring to FIG. 2 and FIG. 3, the top edges 314 of the arc-shaped parts 31 may be located at same heights and are concyclic. Each arc-shaped part 3 has an inner arc edge 317 and an outer arc edge 318. The inner arc edges 317 of the arc-shaped parts 31 are located at same heights and are concyclic, and the outer arc edges 318 of the arc-shaped parts are located at same heights and are concyclic. Further, referring to FIG. 4, the radial section of the first end 311 of each arc-shaped part 31 includes a first vertex 3111 and two first bottom end points 3112. The shape of the radial section of the second end 312 is same as the radial section of the first end 311 of each arc-shaped part 31, and details are not described herein. Further, referring to FIG. 5, the radial section of the middle part 313 of each arc-shaped part 31 includes a middle vertex 3131 and two middle bottom end points 3132. The first vertex 3111 and the two first bottom end points 3112 of the radial section of the first end 311 are respectively located at the same positions as the middle vertex 3131 and two middle bottom end points 3132 of the radial section of the middle part 313, so that the inner arc edges 317 of the arc-shaped parts 31 can each present a smooth arc shape and are connected to each other to form a circle, and the outer arc edges 318 of the arc-shaped parts 31 can each present a smooth arc shape and are connected to each other to form a circle. The entire wave-shaped elastic protrusion 30 is smoother and can present a more linear, symmetrical and balanced operation curve.

Further, to make the surround structure 1 have better symmetry, the wave-shaped elastic protrusion 30 and each arc-shaped part 31 may be symmetrically designed. For example, in the embodiment of FIG. 3, each arc-shaped part 31 may be symmetrically disposed by using the middle part 313 as a center. In addition, in the embodiment of FIG. 2, the wave-shaped elastic protrusion 30 includes an odd quantity of arc-shaped parts 31 (which are nine arc-shaped parts 31 in this embodiment) and is symmetrically disposed with respect to a reference plane E. The reference plane E is coplanar with the first end 311 of one of the arc-shaped parts 31 and the middle part 313 of another arc-shaped part 31. The overall symmetry of the wave-shaped elastic protrusion 30 can be further improved and a more symmetrical operation curve (for example, the foregoing described rigidity-displacement curve) can be presented.

Figure 7:
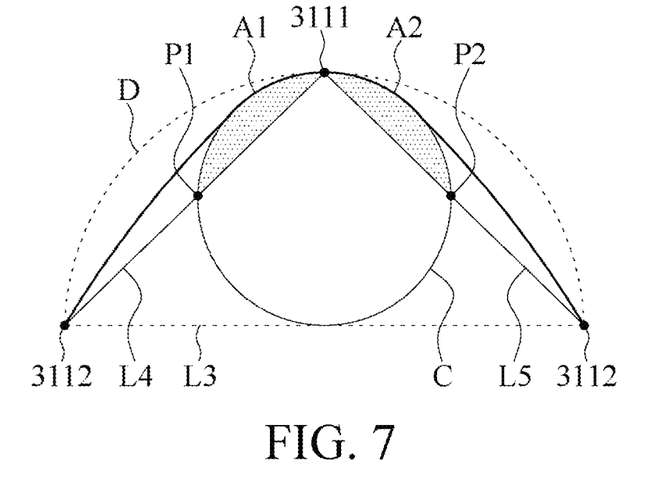
FIG. 7 is a schematic diagram by using an interpolation method applied to a surround structure according to an embodiment of this application.

In an embodiment, the curvature of the radial section (referring to FIG. 5) of each of the arc-shaped segments 315 and 316 in the middle part 313 may be obtained by using interpolation calculation. For example, in an embodiment of FIG. 7, the radial section of each arc-shaped part 31 at the first end 311 is semicircular (shown as a dashed line D) and includes a first vertex 3111 and two first bottom end points 3112 (referring to FIG. 4). A reference line L3 is defined between the two first bottom end points 3112. A reference circle C is defined according to the first vertex 3111 and a midpoint of the reference line L1. Connection lines L4 and L5 between the first vertex 3111 and the first bottom end points 3112 run through the reference circle C to form intersection points P1 and P2. The curvature (referring to FIG. 5) of each of the arc-shaped segments 315 and 316 in the middle part 313 is defined according to arcs A1 and A2 from the intersection points P1 and P2 to the first vertex 3111. For example, curvature of an arc from a top end of each of the arcs A1 and A2 in a tangent line direction to each of the two first bottom end points 3112 is the curvature of each of the arc-shaped segments 315 and 316 in the middle part 313.

Figure 8:
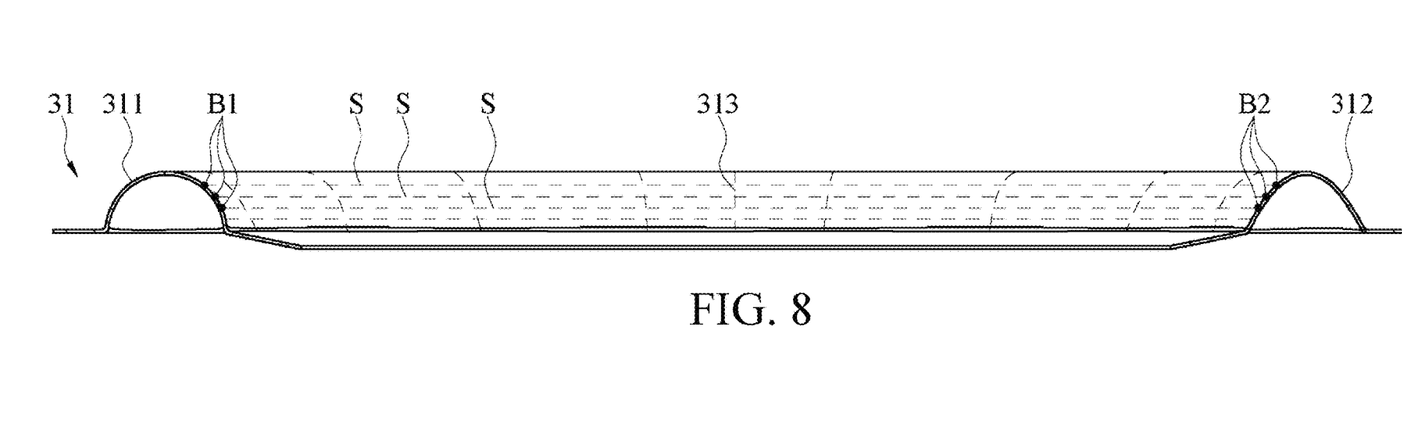
FIG. 8 is a schematic diagram by using a spline method applied to a surround structure according to an embodiment of this application.

In an embodiment, the curvature of the radial section of each of the arc-shaped segments 315 and 316 from the first end 311 to the middle part 313 and the curvature of each of the arc-shaped segments 315 and 316 from the middle part 313 to the second end 312 may be obtained by using spline calculation. As shown in FIG. 8, in each arc-shaped part 31, a plurality of first sampling points B1 may be defined at the first end 311 with different heights, and a plurality of second sampling points B2 respectively corresponding to the plurality of first sampling points B1 may be defined on the second end 312. The plurality of first sampling points B1 is respectively connected to the plurality of second sampling points B2, to form a plurality of splines S respectively along an extending direction of the surround structure 1. In this embodiment, the curvature of each of the arc-shaped segments 315 and 316 from the first end 311 to the middle part 313 and the curvatures from the middle part 313 to the second end 312 may be obtained according to the surfaces formed between the plurality of splines S.

Based on the above, in the surround structure of a speaker in this application, the curvature of the radial section of each arc-shaped segment from the first end to the middle part gradually decreases, and the curvature of the radial section of each arc-shaped segment from the middle part to the second end gradually increases, so that the surface of each arc-shaped part of the wave-shaped elastic protrusion has a curvature variation instead of having a uniform shape. Accordingly, the overall rigidity of the surround structure can be changed, and the surround structure has a more linear operation curve and better symmetry and balance between a negative displacement and a positive displacement, thereby effectively decreasing sound distortion.

Figure 9:
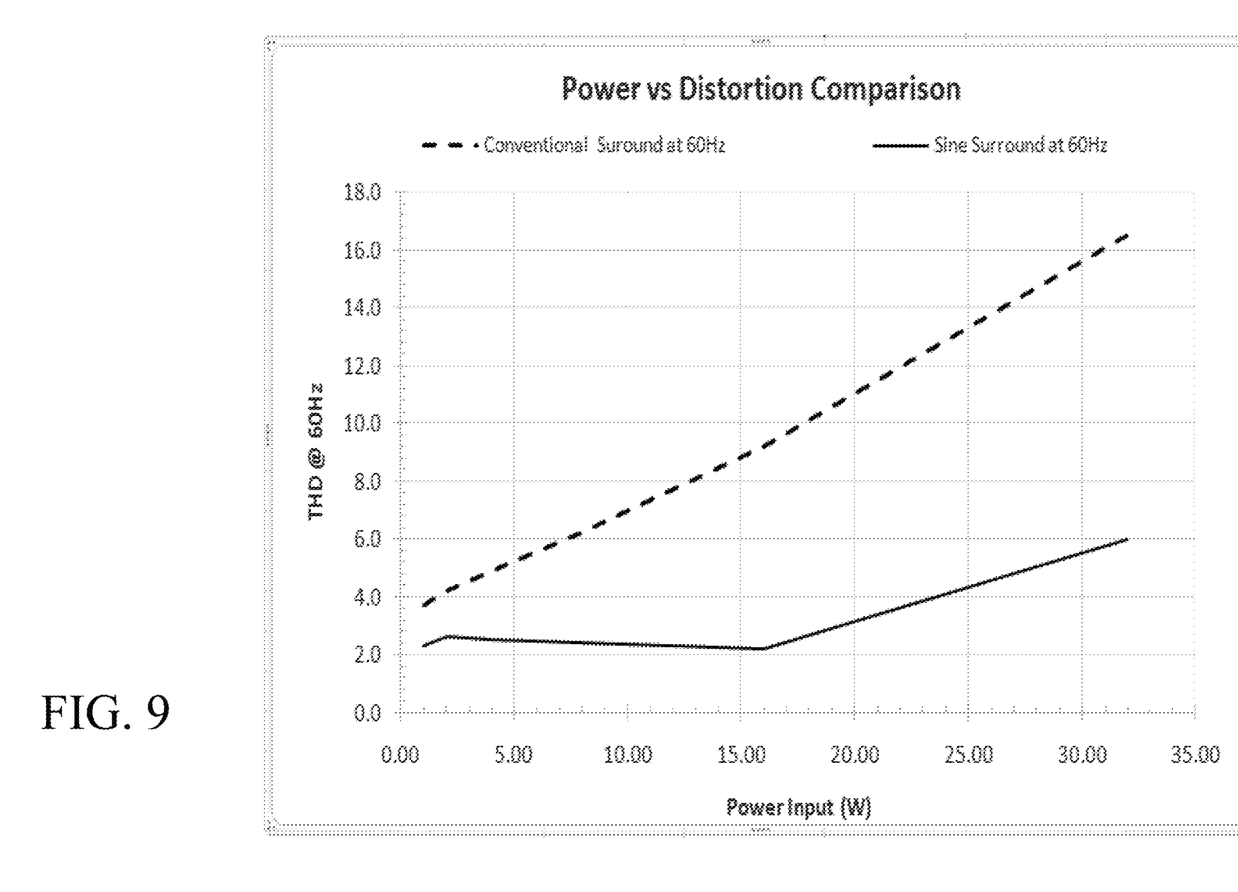
FIG. 9 is the measurement report of "Power vs. Distortion Comparison" according to an embodiment of this application.
Figure 10:
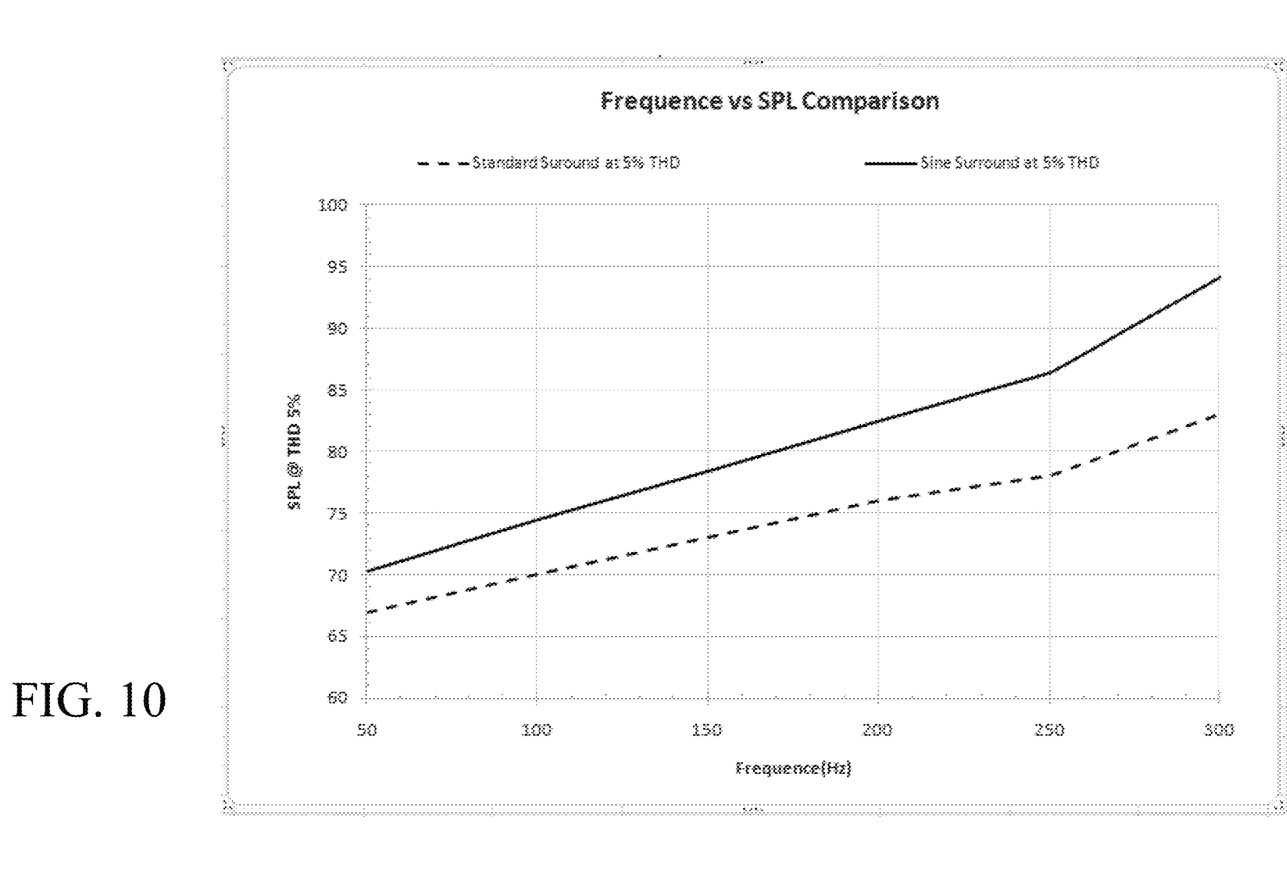
FIG. 10 is the measurement report of "Frequency vs. SPL Comparison" according to an embodiment of this application.

FIG. 9-10 illustrate the measurement report according to an embodiment of the surround provided in this application.

FIG. 9 shows the total harmonic distortion (THD) comparison between the embodiment of the surround (sine surround) provided in this application (solid line) and the conventional surround (dot line). As shown in FIG. 9, at 60 Hz, when the power is increased (from 1 W till 32 W), the THD of the surround (sine surround) provided in this application (solid line) is much smaller than the conventional surround (dot line).

FIG. 10 shows the sound pressure (SPL) comparison between the embodiment of the surround (sine surround) provided in this application (solid line) and the conventional surround (dot line). As shown in FIG. 10, at 5% THD, when the frequency is increased (from 50 Hz till 300 Hz), the SPL of the surround (sine surround) provided in this application (solid line) is much larger than the conventional surround (dot line).

Figure 11:
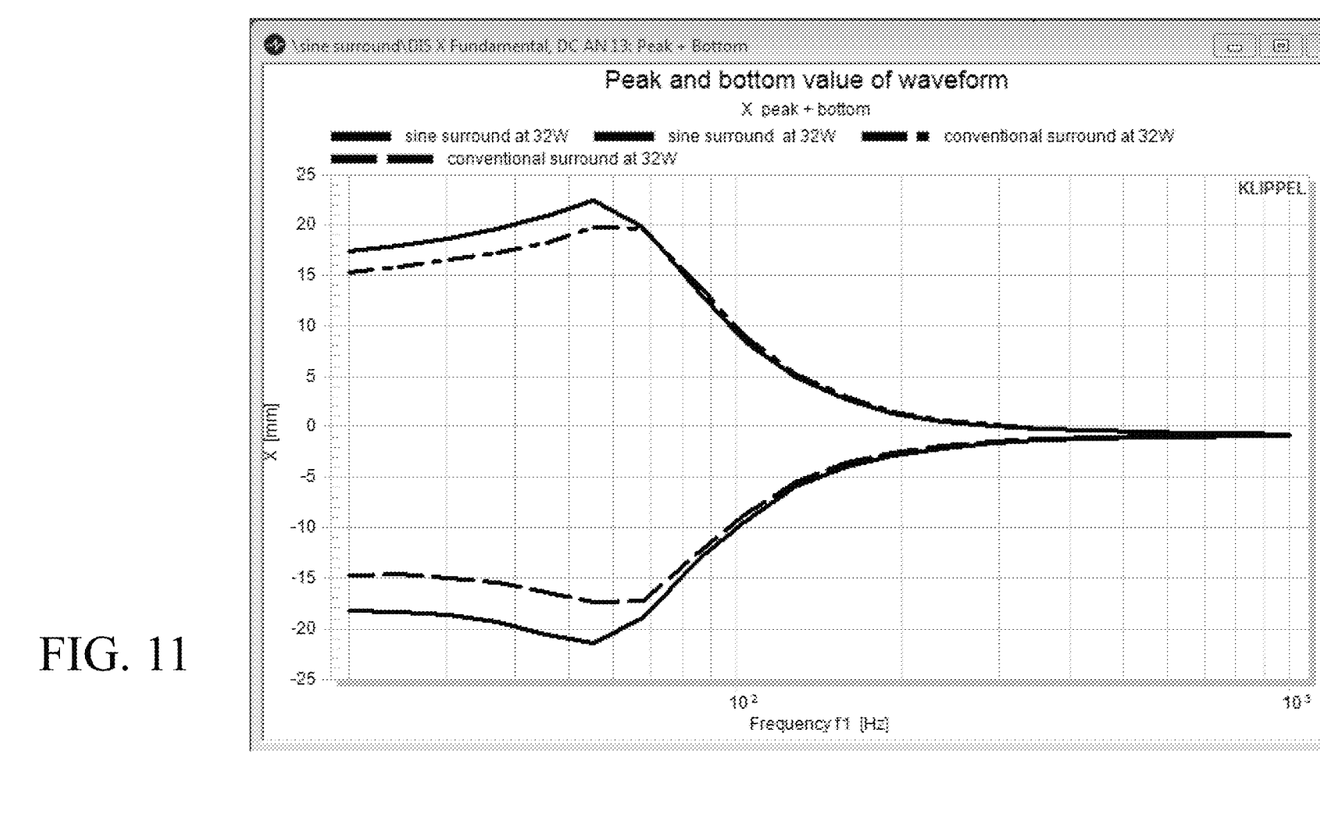
FIG. 11 is the measurement report of "Peak and bottom value of waveform" according to an embodiment of this application.

FIG. 11 shows the reciprocating vibration comparison between the embodiment of the surround (sine surround) provided in this application (solid line) and the conventional surround (dot line). As shown in FIG. 11, when the power is at 32W, the displacement of the surround (sine surround) provided in this application (solid line) is more symmetrical than the conventional surround (dot line).

Although this application has been disclosed above through the embodiments, the embodiments are not intended to limit this application. Any person skilled in the art can make some variations and modifications without departing from the spirit and scope of this application. Therefore, the protection scope of this application shall be subject to the scope of the appended claims.

What is claimed is:

1. A surround structure of a speaker, comprising:
   an inner rim;
   an outer rim; and
   a wave-shaped elastic protrusion, disposed between the inner rim and the outer rim,
   wherein the wave-shaped elastic protrusion is integrally formed by a plurality of arc-shaped parts surrounding each other, each arc-shaped part comprising:
   a first end;
   a second end; and
   a middle part between the first end and the second end,
   wherein a radial section of each arc-shaped part is arcuate and comprises two arc-shaped segments and a top edge located between the two arc-shaped segments, and
   wherein a curvature of a radial section of each arc-shaped segment from the first end to the middle part gradually decreases, a curvature of a radial section of each arc-shaped segment from the middle part to the second end gradually increases, and a shape of a radial section of the first end is the same as a shape of a radial section of the second end.

2. The surround structure of a speaker according to claim 1, wherein the top edges of the arc-shaped parts are located at same heights and are concyclic.

3. The surround structure of a speaker according to claim 1, wherein each arc-shaped part comprises an inner arc edge and an outer arc edge, the inner arc edges of the arc-shaped parts are located at same heights and are concyclic, and the outer arc edges of the arc-shaped parts are located at same heights and are concyclic.

4. The surround structure of a speaker according to claim 1, wherein each arc-shaped part is symmetrically disposed by using the middle part as a center.

5. The surround structure of a speaker according to claim 1, wherein the radial section of the first end and the radial section of the second end are semicircular.

6. The surround structure of a speaker according to claim 1, wherein the wave-shaped elastic protrusion is symmetrically disposed with respect to a reference plane, and the reference plane is coplanar with the first end or the second end of one of the arc-shaped parts.

7. The surround structure of a speaker according to claim 6, wherein the wave-shaped elastic protrusion comprises an odd quantity of arc-shaped parts, and the reference plane is further coplanar with the middle part of another arc-shaped part.

8. The surround structure of a speaker according to claim 1, wherein each arc-shaped segment comprises one first point on the first end and one second point on the second end, and
   wherein the first point and the second point are located at same heights, and a connection line from the first point to the second point along a surface of the arc-shaped segment is a smooth curve.

9. The surround structure of a speaker according to claim 1, wherein the radial section of the first end of each arc-shaped part comprises a first vertex and two first bottom end points, and a reference line is defined between the two first bottom end points, and
   wherein a reference circle is defined according to the first vertex and a midpoint of the reference line, connection lines between the first vertex and the first bottom end points run through the reference circle to form intersection points, and a curvature of each arc-shaped segment in the middle part is defined according to an arc from the intersection point to the first vertex.

10. The surround structure of a speaker according to claim 1, wherein each arc-shaped part comprises a plurality of first sampling points at positions of different heights on the first end and a plurality of second sampling points respectively corresponding to the plurality of first sampling points on the second end, the curvature of the radial section of each arc-shaped segment from the first end to the middle part and the curvature of the radial section from the middle part to the second end are defined according to respective connection lines between the plurality of first sampling points and the plurality of second sampling points.

* * * * *